Feb. 22, 1949.  R. BATCHLER  2,462,348
PIPE JOINT
Filed March 24, 1944
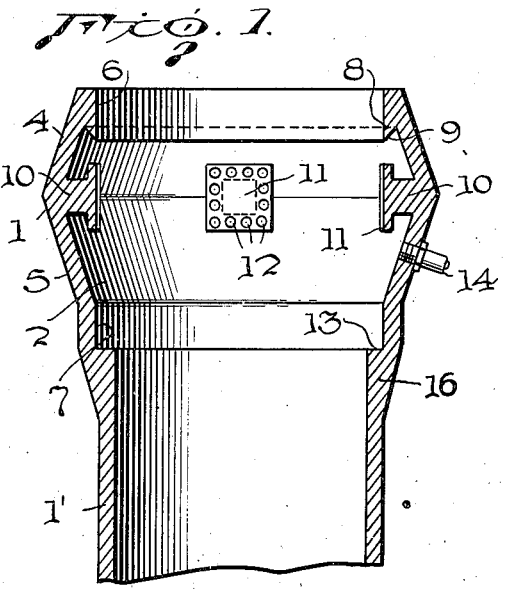
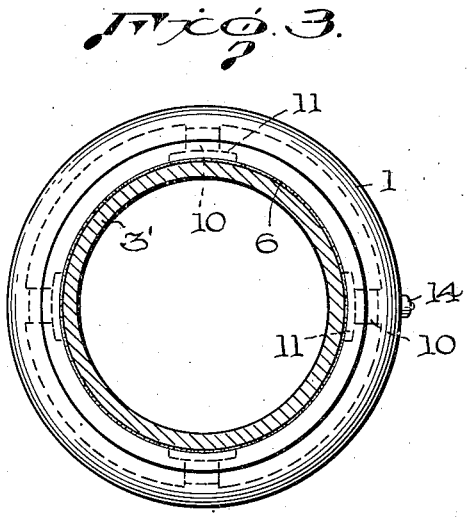
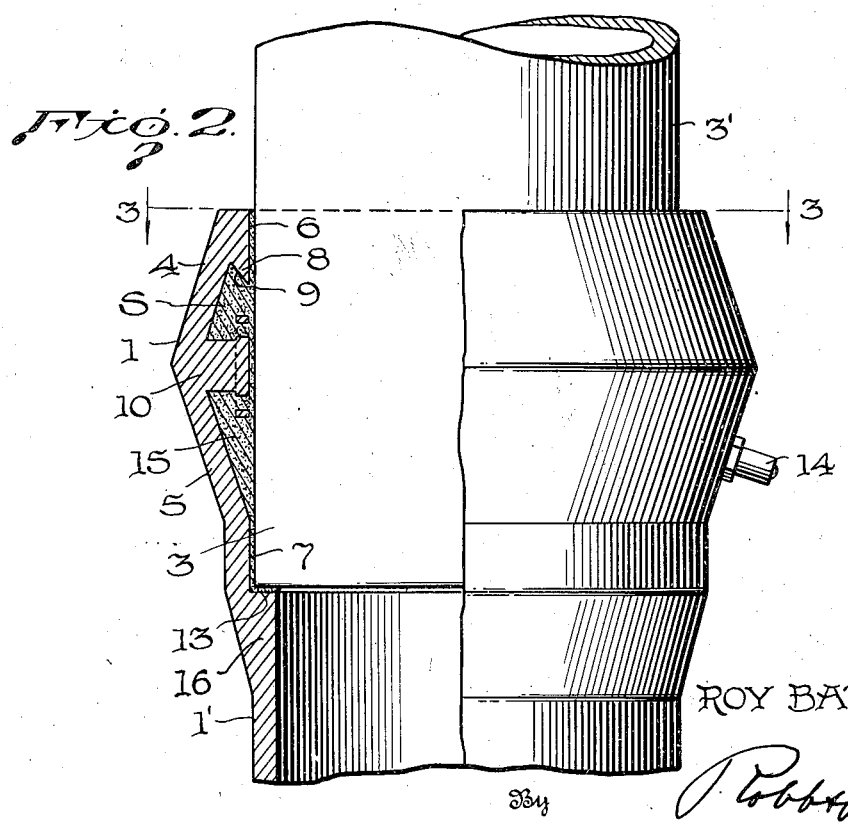
Inventor
ROY BATCHLER Patented Feb. 22, 1949

2,462,348

UNITED STATES PATENT OFFICE 2,462,348

PIPE JOINT

Roy Batchler, Washington, D. C.

Application March 24, 1944, Serial No. 527,973

1 Claim. (Cl. 285—115)

This invention relates to pipe joints, and more especially to an improved pipe joint of exceedingly simple construction and which will remain fluid-tight for far greater periods of time than the usual bell and spigot joint, which is the most common type of joint in use today.

The bell and spigot type of joint is characterized by a socket on the end of one pipe, which socket receives the plain end of another pipe which is to be connected with the first. After fitting the pipes together, the joint is usually sealed by one or more sealing materials, usually lead alone, or, according to the most common type of seal, fibrous material known as oakum, in combination with lead. The oakum is ordinarily packed tightly in the bottom of the joint and then molten lead is poured into the joint over the oakum, until the joint is completely filled. This obviously is a time-consuming procedure, and requires more than an ordinary degree of skill.

Moreover, in the application of these joints to sewer pipes, the sewer acids are absorbed by the oakum and the oakum rapidly deteriorates by the action of the acids, with the result that the joint soon starts to leak, necessitating a comparatively expensive repair job. This leakage occurs notwithstanding the lead seal, because the lead tends to crack or separate from the pipe due to expansion and contraction under changes in temperature, and the difference in the coefficient of expansion of the lead as compared with that of the pipe, which oftentimes results in fracture of the joint irrespective of other causes of leakage.

Despite the expense of installation and inherent infirmities of joints of this kind, they have been used for many, many years with practically no improvement, and are still in extensive use today for gas, water, sewer, general plumbing, and other piping.

It is the primary object of my invention to simplify and provide an improved joint which may be more easily and quickly installed and at less expense than heretofore, and which will remain fluid-tight indefinitely.

A further object of this invention is to provide an improved joint of the bell and spigot type which may be safely used for high pressure lines, as well as for general use, and which may be applied to pipes of any size without the use of external bands or rings which are usually required at the joints of large pipes and which materially add to the expense thereof.

More specifically stated, my invention is characterized by the provision of a bell or socket of unique construction, in association with the spigot end of the adjoining pipe, which bell or socket is provided interiorly thereof with a plurality of lugs serving to reinforce the bell as well as to guide the spigot end of the adjoining pipe into the bell and act as supports for the latter. The bell is, according to my invention, also provided with a fitting, such as the well known type of "Alemite" fitting, and by means of which a normally fluent or plastic sealing material, such as a rubberoid compound, asphaltic compound, plastic cement or the like, may be conveniently forced under pressure through the fitting to fill the joint after the bell and spigot ends of the pipe have been brought together. The joint is thus effectively and expeditiously sealed, and the sealing material may be forced into the joint either while hot or in the cold, depending on the type of material preferred. After setting, the sealing material should preferably retain some plasticity or flexibility sufficient to allow expansion and contraction of the pipes without rupture of the seal or fracture of the joint.

Other and further objects and advantages of the invention will be hereinafter described and the novel features thereof defined by the appended claim.

In the drawing:

Figure 1 is a longitudinal sectional view taken through the bell or socket end of a pipe, showing the form of the same as employed in my improved pipe joint;

Figure 2 is an elevational view on a somewhat enlarged scale of the complete joint, after introduction of the sealing compound, and with a portion of the bell or socket broken away and shown in section; and Figure 3 is a horizontal sectional view taken on the line 3—3 of Figure 2.

Like reference characters designate corresponding parts in the several figures of the drawing, wherein I denotes the bell end of a pipe I', which bell forms a socket 2 for receiving the spigot or plain end 3 of another pipe 3' to be joined with the first. As best seen in Figures 1 and 2, the bell member I is tapered in opposite directions, as indicated at 4 and 5 respectively, thereby reducing the opposite ends 6 and 7 respectively of the bell member to a size substantially corresponding to the size of the spigot member 3. The outermost end 6 of the bell member I is also preferably provided with an annular shoulder 8, the lower face of which is inclined, as indicated at 9, for a reason which will hereinafter more fully appear.

Carried by the bell member I and extending radially inwardly therefrom is a plurality of lugs 10, the innermost faces 11 of which are of substantial area and terminate on a cylindrical projection corresponding to the diameter of the reduced ends 6 and 7 of the bell member 1. As shown in the drawing (Fig. 3), the faces 11 are of somewhat arcuate form, approximately corresponding to the outer diameter of the spigot member 3, so that the lugs will aid in guiding the spigot member 3 into the socket 2 of the bell member, in assembling the joint, and thereafter serve as additional supports for the spigot member 3. These lug members 10 additionally serve to reinforce or stiffen the bell, and if desired, their enlarged inner faces 11 may be provided with a plurality of apertures 12, although the latter are not essential to my invention. The number of lugs may be varied according to the size of the pipe joint, it being understood that my invention is not limited to any particular size of pipe. Thus, while I have shown four lugs for purposes of illustration herein, this is not to be taken as a limitation on my invention as hereinbefore mentioned. Whatever the number of lugs provided, they are preferably arranged in equidistantly spaced relation to each other about the central axis of the bell member, with their centers located in an imaginary plane extended transversely through the bell member at the intersection of the oppositely inclined walls of the latter.

In assembling the joint, the spigot member 3 is axially inserted into the socket 2 of the bell member 1 until the inner end of the spigot member 3 engages, or is in close proximity to, the annular ledge or shoulder 13 formed in the bell member at the bottom of the socket. When so positioned, the spigot member 3 is held in coaxial relation to the bell member 1 by the reduced ends 6 and 7 of the bell member, and the intermediate lugs 10, these reduced ends and lugs being constructed with a sufficient tolerance to permit the introduction of the spigot member 3 into the socket, but with a minimum of radial play therebetween.

After assembly of the joint in the manner just described, a suitable sealing material S is introduced into the space in the socket lying between the outer wall of the spigot member 3 and the inner wall of the bell member 1. For this purpose, the bell member is provided with a fitting 14, which may be of any suitable type, such as an "Alemite" fitting, "Zerk" fitting, or the like, which admits of the passage of a fluent sealing material, under pressure, through the bell member, into the space as indicated at 15 in Figure 2 of the drawing. The sealing material may be of any suitable type which may be forced into the joint either hot or in the cold, and which, when allowed to set, will retain some degree of plasticity or flexibility to allow for contraction and expansion of the pipes, particularly in a radial direction, without rupture of the seal or fracture of the joint. Materials in the nature of a rubberoid compound, asphaltic compound, or plastic cement have been found to be satisfactory for these purposes, but are not to be taken as limitations upon this invention, since other compounds will readily suggest themselves to those skilled in the art.

In introducing the sealing material through the fitting 14, a pressure gun, similar to a grease gun, or other comparable pressure device, may be employed to force the sealing material into the space 15, the details of which are not necessary to an understanding of this invention. The flow of the sealing material is continued until the space 15 is completely filled, as will be indicated by the extrusion of the sealing material outwardly at the top of the joint, that is, between the reduced end 6 of the bell member and the spigot member 3. The inclined face 9 of the flange 8 serves to retain the sealing material in the space 15, without permitting the material to be extruded between the end 6 of the bell and the spigot member 3, until after the joint has been completely filled. Thereafter, when the sealing material begins to force its way past the flange 8 and out between the end 6 and the spigot member 3, the introduction of the sealing material through the fitting is terminated, with the assurance that the joint is completely filled. When the joint is completely filled, the lugs 10 will be enveloped by or embedded in the sealing material so that in effect the sealing material becomes a unitary part of the joint which includes the bell member 1. Where the faces of the lugs 10 are provided with the apertures 12, the sealing material will be forced through the apertures and thus become interlocked with the lugs.

Due to the tolerance afforded by the fit of the spigot member 3 in the socket 2 as previously described, a thin film of the sealing material will force its way between the inner faces of the lugs 10 and the spigot member 3, as well as between the reduced ends 6 and 7 respectively of the bell member 1 and the spigot member 3, as the last of the sealing material is forced into the joint just prior to termination of the pressure thereon when the extruded material begins to appear at the top of the joint. This works to a distinct advantage, rather than any disadvantage, since the resiliency or flexibility of the sealing material which remains after setting of the joint will more readily admit of limited expansion and contraction of the pipes without fracture of the joint. Where a still greater allowance for expansion and contraction must be accommodated, a flexible gasket (not shown) may be interposed between the spigot member 3 and the bell member 1 at the reduced ends 6 and 7 of the latter.

By the use of a sealing material S of the type known as "Smooth-on" metal bonding cement, or the equivalent thereof, I am able to produce an effective metal bond between the bell end 1 of the pipe 1' and the spigot end 3 of the pipe 3', which is superior to anything which has been heretofore deemed possible in a joint of this character. In such a case, the enlarged faces 11 of the lugs 10 will contribute to the attainment of such bond when the sealing material is forced into the joint where it will envelope the lugs 10 and additionally force its way between the broad faces 11 of the lugs and the contiguous surface of the spigot end 3 of the pipe 3', thereby bonding the lugs to the spigot end 3.

It will be seen from the foregoing description of my improved pipe joint that the joint is exceedingly simple in construction and admits of much easier and quicker installation than the ordinary bell and spigot type of joint, with the further advantage that little, if any, particular skill is required, yet affording complete assurance that a perfect seal will be attained. This seal is not only effective for gas, water, sewer, ordinary plumbing and other pipe lines, but is also effective for relatively high pressure pipes. In all cases, deterioration of the sealing material is completely eliminated, and in addition, external reinforcing bands or rings, which are usually necessary for pipe joints of large size, are dispensed with.

The tendency of the usual bell and spigot joints to fracture at the joint is further promoted by the fact that the pipe ordinarily has a very thin section at the "neck" of the bell, that is, where the bell merges into the pipe proper at the bottom of the bell. Accordingly, in the great majority of cases, fractures occur at this neck or thin section. I have found that this condition may be remedied by the provision of a thickened wall at the point where the bell merges into the pipe proper, as best shown at 16 in Figures 1 and 2 of the drawings. This thickened wall 16 extends for a substantial distance below the bell, and gradually merges into the pipe proper 1', the latter thus forming a continuation of the pipe 3'.

My improved pipe joint also more readily lends itself to salvage operations without necessitating destruction or fracture of the pipe or the component parts of the joint, inasmuch as the sealing material employed is preferably such that it may be again reduced to a fluid or plastic state, after setting, by the application of a blow torch or other source of heat, following which the pipes may be separated and the joints cleaned out preparatory to further use.

Still another important advantage derived from my invention resides in the convenient adaptability of my improved pipe joint structure to manufacture by centrifugal casting methods, although it is to be understood that the manufacture of pipes of the character described herein is not limited to such methods.

Having thus described the details of my invention, other changes and alterations may be made without departing from the spirit thereof as defined by the appended claim.

I claim:

A pipe joint, comprising a bell member having its opposite ends reduced in size and forming a socket therebetween, a spigot member axially projecting into the socket of said bell member and substantially conforming in size to the opposite ends of the bell member, a plurality of circumferentially spaced lugs carried by said bell member in axially spaced relation to the reduced opposite ends of the latter and extending radially inwardly therefrom in cooperative supporting relation to the spigot member, said lugs each being provided with a bearing face of substantial area, the outer margins of which overhang the contiguous walls of the bell member and are provided with apertures extending therethrough, a fluent sealing material filling the socket about the spigot member and enveloping the lugs aforesaid, and means for admitting the fluent sealing material through the bell and into the socket thereof.

ROY BATCHLER.

REFERENCES CITED

The following references are of record in the file of this patent:

UNITED STATES PATENTS

| Number | Name | Date |
| --- | --- | --- |
| 1,184,066 | Bowie | May 23, 1916 |
| 1,292,072 | Rooney | Jan. 21, 1919 |

FOREIGN PATENTS

| Number | Country | Date |
| --- | --- | --- |
| 10,923 | Great Britain | June 1, 1895 |
| 22,396 | Great Britain | Oct. 22, 1908 |